United States Patent
Mohapatra et al.

(10) Patent No.: US 9,143,431 B2
(45) Date of Patent: Sep. 22, 2015

(54) HIDING A SERVICE NODE IN A NETWORK FROM A NETWORK ROUTING TOPOLOGY

(75) Inventors: Pradosh Mohapatra, Fremont, CA (US); Stefano B. Previdi, Rome (IT); Clarence Filsfils, Brussels (BE); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 12/981,444

(22) Filed: Dec. 29, 2010

(65) Prior Publication Data

US 2012/0170486 A1 Jul. 5, 2012

(51) Int. Cl.
*H04L 12/28* (2006.01)
*H04L 12/751* (2013.01)

(52) U.S. Cl.
CPC .................................... *H04L 45/025* (2013.01)

(58) Field of Classification Search
CPC ............................. H04L 45/025; H04L 12/28
See application file for complete search history.

(56) References Cited

U.S. PATENT DOCUMENTS

| 6,820,134 | B1 * | 11/2004 | Zinin et al. | 709/238 |
| 7,437,476 | B2 | 10/2008 | Zinin et al. | |
| 2007/0019676 | A1 * | 1/2007 | Kompella | 370/468 |
| 2009/0232005 | A1 * | 9/2009 | Mohan et al. | 370/241.1 |
| 2010/0226382 | A1 * | 9/2010 | Kini et al. | 370/401 |

OTHER PUBLICATIONS

IETF RFC2328 OSPF Version 2 on Apr. 1998.*
"Traffic Localization for P2P-Applications: The ALTO Approach"—IEEE P2P'09 by Seedorf et al. on Sep. 2009.*
Stiemerling, M. et al. "ALTO Deployment Considerations draft-ietf-alto-deployments00" expires Aug. 25, 2011 (33 pages).
Alimi, R. et al., "ALTO Protocol draft-ietf-alto-protocol-06.txt" expires Apr. 28, 2011 (66 pages).
Kiesel, S. et al., "Application-Layer Traffic Optimization (ALTO) Requirements draft-ietf-alto-reqs-07.txt" (22 pages).
Seedorf, J. et al., "Application-Layer Traffic Optimization (ALTO) Problem Statement" Oct. 2009 (14 pages).

* cited by examiner

*Primary Examiner* — Phirin Sam
*Assistant Examiner* — Hai-Chang Hsiung
(74) *Attorney, Agent, or Firm* — Hickman Palermo Becker Bingham LLP (57) ABSTRACT

Hiding a service node in a network from a network topology is provided. In one embodiment, for example, an apparatus for hiding a service node in a network from a network topology, the apparatus comprising: a network interface; a processor; and one or more stored sequences of instructions which, when executed by the processor, cause the processor to perform: discovering a service node in a data network in accordance with a link-state protocol wherein the service node provides a network topology dependent service other than packet forwarding; establishing a link-state adjacency with the service node and one or more packet forwarding nodes in accordance with the link-state protocol; receiving a link-state advertisement; in response to identifying the link-state advertisement as an originating link-state advertisement sent from the service node, suppressing flooding of the received link-state advertisement to the one or more packet forwarding nodes.

20 Claims, 3 Drawing Sheets

HIDING A SERVICE NODE IN A NETWORK FROM A NETWORK ROUTING TOPOLOGY

TECHNICAL FIELD

The present disclosure generally relates to computer networking and, more particularly, relates to hiding a service node in a network from a network routing topology.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many Internet Service Providers (ISPs), network administrators, and network operators, among others, configure packet switching routers deployed in networks they manage to use an interior gateway protocol to exchange routing information between the routers. Many network equipment manufacturers and vendors sell routers capable of exchanging routing information with other routers in a network using an interior gateway protocol.

There are two main classes of interior gateway protocols: distance-vector routing protocols and link-state routing protocols. In typical implementations of a link-state routing protocol, each router in a network discovers neighboring routers in the network and establishes an adjacency relationship with each neighboring router. Such neighboring router(s) are often referred to as "adjacencies". The router periodically sends an advertisement message to each adjacency that may include an identification of each of the advertising router's network links, and for each identified link, the state of the link, the metric cost of the advertising router's interface to the link, and any neighboring routers connected to the link.

Typically, each router receiving an advertisement floods the advertisement to all of its own adjacencies (except to the router from which the advertisement was received). Each router stores information from each advertisement the router receives in a link-state database. Each router maintains its own copy of the link-state database in a computer memory of the router. Ideally, each router in the network receives the advertisements sent by every other router in the network and each link-state database in each router converges to same representation of the state of the network. Each router in the network uses information in its link-state database to construct a topology of the network representing the shortest (lowest cost) path to every other router in the network. Such topology is typically constructed using a shortest path first algorithm. A data representation of the constructed topology commonly referred to as a routing table is also stored in the router's memory. Each router uses its routing table to forward network data packets the router receives onto destinations in the network.

Because each router's link-state database stores information about every other router in the network, the computer memory size of each link-state database at each router increases as the number of routers in the network increases. The greater the size of the link-state database at a router, the more computer memory the router needs to store the link-state database and the more processing resources the router needs to calculate a topology of the network in a constant or near constant amount of time. Thus, adding a router to a network has an adverse impact on the computing resource requirements of the existing routers in the network.

Increasingly, network services provide a network topology dependent service other than packet forwarding. For example, there are standardization efforts underway to provide peer-to-peer (P2P) applications in a network with information about the network to perform better-than-random initial peer selection. As another example, an Internet Service Provider (ISP) may deploy a network topology dependent service in its networks to support other non-routing network applications such as Network Address Translation (NAT), Deep Packet Inspection (DPI), video monitoring, mobility, etc.

For such network topology dependent services to provide information about the network to other network applications, the services may require a topology view of the network. One approach to providing a topology view of the network to a network topology dependent service is to have the service participate in the link-state protocol used by the network. In this approach, the service establishes adjacencies with neighboring routers, collects link-state advertisements as part of normal link-state protocol operation and can obtain information about the state and topology of the network and use the obtained information for providing a network topology dependent service. However, because adding a network element that participates in the link-state protocol to a network increases the size of the link-state database at each router in the network, each network topology dependent service added to a network adds to the computing resource requirements of all routers in the network. Furthermore, the other routers in the network may include the service in their calculated packet forwarding paths, potentially overwhelming the service with network traffic to be forwarded.

DETAILED DESCRIPTION

Hiding a service node in a network from a network routing topology is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

The needs identified in the foregoing Background, and other needs and objects that will become apparent from the following description, are achieved in the present invention, which comprises, in one aspect, a method for hiding a service node in a network from a network routing topology. The method includes the steps of discovering a service node in a data network in accordance with a link-state protocol, wherein the service node provides a network topology dependent service other than packet forwarding, establishing a link-state adjacency with the service node and one or more packet forwarding nodes in accordance with the link-state protocol, and receiving a link-state advertisement, and in response to identifying the received link-state advertisement as an originating link-state advertisement sent from the service node, suppressing flooding of the received link-state advertisement to the one or more packet forwarding nodes.

In another aspect, the method further comprises identifying and extracting tagged information contained in the received link-state advertisement sent from the service node, merging the tagged information with information to be sent in an originating link-state advertisement, and sending an originating link-state advertisement containing the merged information.

In other embodiments, the invention encompasses a computer apparatus and a non-transitory computer-readable medium configured to carry out the foregoing steps.

Structural and Functional Overview

Figure 1:
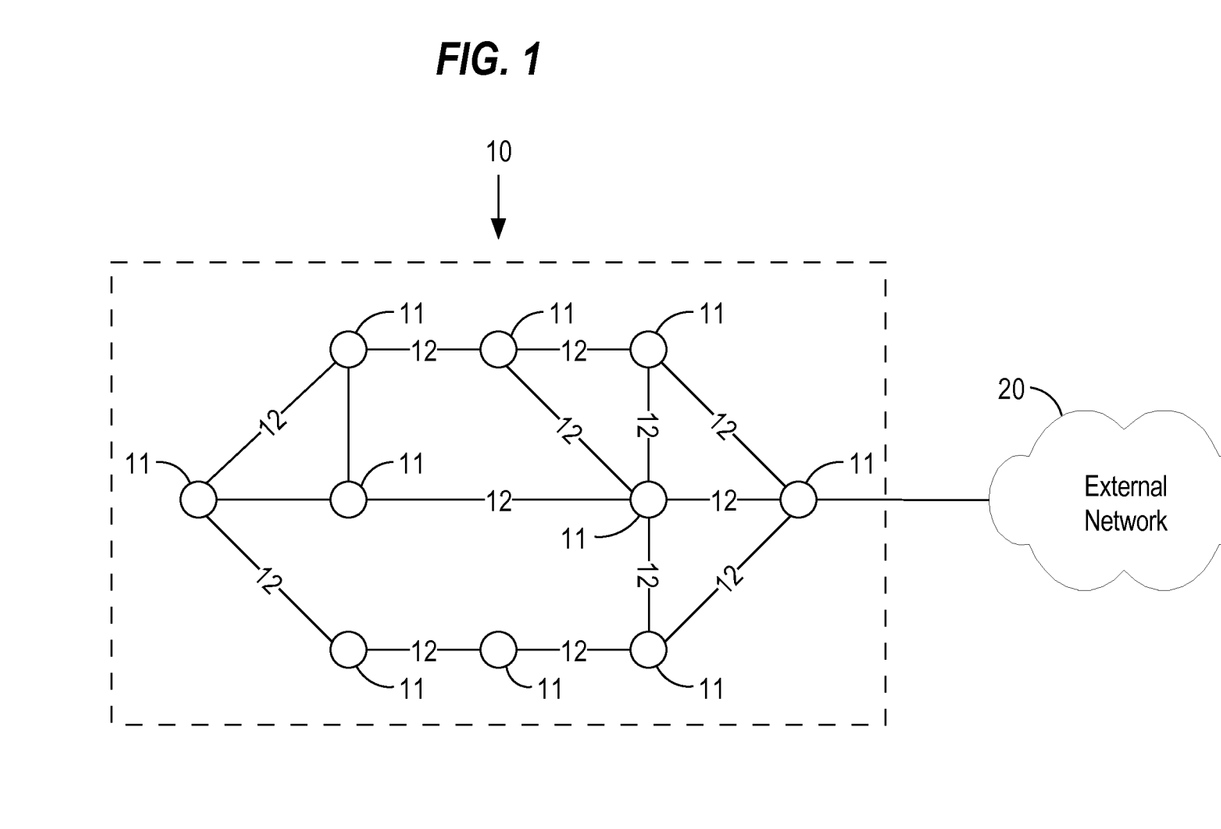
FIG. 1 a block diagram of a packet switching data network in accordance with an embodiment.

FIG. 1 is a block diagram of a packet switching data network 10, in accordance with an embodiment. The network 10 includes a plurality of network nodes 11 interconnected by a plurality of network links 12. In an embodiment, network 10 is part of an Autonomous System (AS) or other set of nodes and links that uses a link-state routing protocol to route data packets within the network 10 in accordance with a coherent interior routing plan. The link-state routing protocol may be the Intermediate system to intermediate system (IS-IS) routing protocol, the Open Shortest Path First (OSPF), or other link-state routing protocol.

The network 10 may correspond to a connected group of one or more Internet Protocol (IP) prefixes under administrative management of one or more network operators. For example, network 10 may be operated by an Internet Service Provider (ISP) or network 10 may be a Local Area Network (LAN) managed by an organization. Network 10 may optionally be connected to one or more external networks 20 using a reachability protocol such as, for example, the Border Gateway Protocol (BGP).

A node 11 in network 10 is any network element that participates in a link-state protocol used within the network 10. As explained in greater detail elsewhere in this specification, some nodes 11 in network 10 are hidden such that they only partially participate in the link-state protocol. A node 11 in network 10 also may be packet forwarding service (i.e., a routing service), an Application-Layer Traffic Optimization (ALTO) service, a proximity routing service, a Network Address Translation (NAT) service, a Deep Packet Inspection (DPI) service, a video monitoring service, or other network service that uses received link-state information. While example network 10, as depicted in FIG. 1, contains only a small number nodes 11 for purposes of illustrating a clear example, in a practical embodiment, network 10 may comprise many hundreds or even many thousands of nodes 11.

A node 11 may be embodied in a routing device, switching device, a server computer, a client computer, a mobile computing device (e.g., a cell phone), a wireless computing device (e.g., a tablet computer), or other networked computing device. More than one node 11 may be embodied in a single networked computing device. A node 11 may perform processes described herein for hiding a service node in a network from a network routing topology thereby transforming the networked computing device in which the node 11 is embodied into a special-purpose networked computing device. The special-purpose networked computing devices may be hard-wired to perform the processes, or may include digital electronic devices such as one or more application-specific integrated circuits (ASICs) or field programmable gate arrays (FPGAs) that are persistently programmed to perform the processes, or may include one or more general purpose hardware processors programmed to perform the processes pursuant to program instructions in firmware, memory, other storage, or a combination. Such special-purpose networked computing devices may also combine custom hard-wired logic, ASICs, or FPGAs with custom programming to perform the processes.

A link 12 corresponds to a communication path in network 10 between two neighboring nodes 11. As multiple nodes 11 may be embodied within a single networked computing device, a link 12 may correspond to a communication path within a networked computing device. A link 12 may correspond to a point-to-point link, such as a serial line, between two neighboring nodes 11. Alternatively, a link 12 may correspond to a multi-access link, such as Ethernet, Token Ring, or Fiber Distributed Data Interface (FDDI), that is shared by two neighboring nodes 11 with other nodes 11 in network 10.

In an embodiment, some nodes in the network operate to "hide" certain nodes in the network from other nodes in the network. The certain nodes are hidden in the sense that the other nodes in the network do not receive link-state protocol advertisements sent by the certain nodes thereby causing the other nodes to not store information in their link-state databases that they would otherwise store if the advertisements of the certain nodes were received by the other nodes. Furthermore, this also causes the other nodes that are routing nodes to not calculate forwarding paths that traverse the certain nodes thereby preventing the certain nodes from receiving network traffic to be forwarded. At the same time, the "hidden" nodes are able to receive link-state protocol advertisements sent from other nodes in the network from which the certain nodes can construct a network topology or other representation of the state of the network. While the term "link-state advertisement" is often used in the context of the Open Shortest Path First (OSPF) link-state protocol, the term "advertisement" as used herein is not limited to OSPF and refers more broadly and more generally to any unit of data formatted in accordance with a link-state protocol for communicating network information within a network.

In an embodiment, a hidden node is a service node. In general, a service node is a node that uses information received in link-state advertisements to provide a network topology dependent service other than packet forwarding. Generally, a network topology dependent service is any network service that uses information received in link-state advertisements to provide the network service. A service node may also optionally advertise service related attributes that are non-routing in nature to other nodes in the network. Non-limiting examples of a network topology dependent service that may be provided by a service node include an Application-Layer Traffic Optimization (ALTO) service, a peer-to-peer (P2P) proximity routing service, a Network Address Translation (NAT) service, a Deep Packet Inspection (DPI) service, and a video monitoring service.

In an embodiment, a service node does not receive any network traffic that would require the service node to perform a routing/forwarding operation. In this embodiment, the service node receives traffic if and only if the traffic is destined to the service node itself. Thus, switching nodes in the network (i.e., nodes that perform packet forwarding) may not route through service nodes. As a network may contain many hundreds of even many thousands of service nodes, it can be a waste of computing resources for switching nodes in the network to store routing information in their link-state databases about such service nodes and can be a waste of computing resources for switching nodes to calculate paths in the network through service nodes. Techniques described herein may be used to "hide" service nodes in the network from switching nodes while at the same time allowing the service nodes to receive link-state advertisements for use in providing a network topology dependent service. Furthermore, the technique allow the service nodes to advertise service related information to other nodes in the network while maintaining the service node as hidden from the other nodes from a routing/forwarding perspective.

In an embodiment, to hide a node in a network, all link-state adjacencies of the hidden node suppress flooding of originating link-state advertisements received from the hidden node. The link-state adjacencies comprise the neighboring nodes in the network of the hidden node with which the hidden node has established a link-state adjacency relationship in accordance with a link-state protocol. For ease of explanation, node(s) that hide a neighboring node to create a hidden node may be referred to hereinafter as the hidden node's "masking nodes". By suppressing flooding of originating link-state advertisements sent by the hidden node at the neighboring masking nodes, other nodes in the network never receive originating link-state advertisements sent by the hidden node thereby causing the other nodes to not store information in their link-state databases that the other nodes would otherwise store in their link-state databases if they had received, through flooding, the originating link-state advertisements sent by the hidden node. As well as suppressing flooding of originating link-state advertisements sent by the hidden node, the masking nodes are configured to not store information in their own link-state databases received in originating link-state advertisements sent from the hidden node. At the same time, the masking nodes are configured to flood link-state advertisements they receive from other nodes in the network onto the hidden node as well as send their own originating link-state advertisements to the hidden node thereby enabling the hidden node to acquire a complete view of the network and construct a complete topology of the network for providing a network topology dependent service.

In an embodiment, the masking nodes are configured to extract designated information contained in originating link-state advertisements sent from the hidden node and include the extracted information in their own originating link-state advertisements. Originating link-state advertisements sent from the masking nodes containing the extracted information are then flooded throughout the network as would occur with conventional link-state protocol operation. In this way, designated information sent from the hidden node can be propagated throughout the network without flooding the originating link-state advertisements sent by the hidden node throughout the network. The designated information can be any information the hidden node is configured to make available to other nodes in the network. The designated information may be dependent on the type of network topology dependent service provided by the hidden node. For example, a route convergence monitoring service may require the ability to propagate markers and other generic information to other nodes in the network. In one embodiment, the masking nodes treat the designated information as opaque data and do not attempt to interpret the designated information when propagating the designated information in their own originating link-state advertisements.

Hiding a Service Node in a Network from a Network Routing Topology

Figure 2:
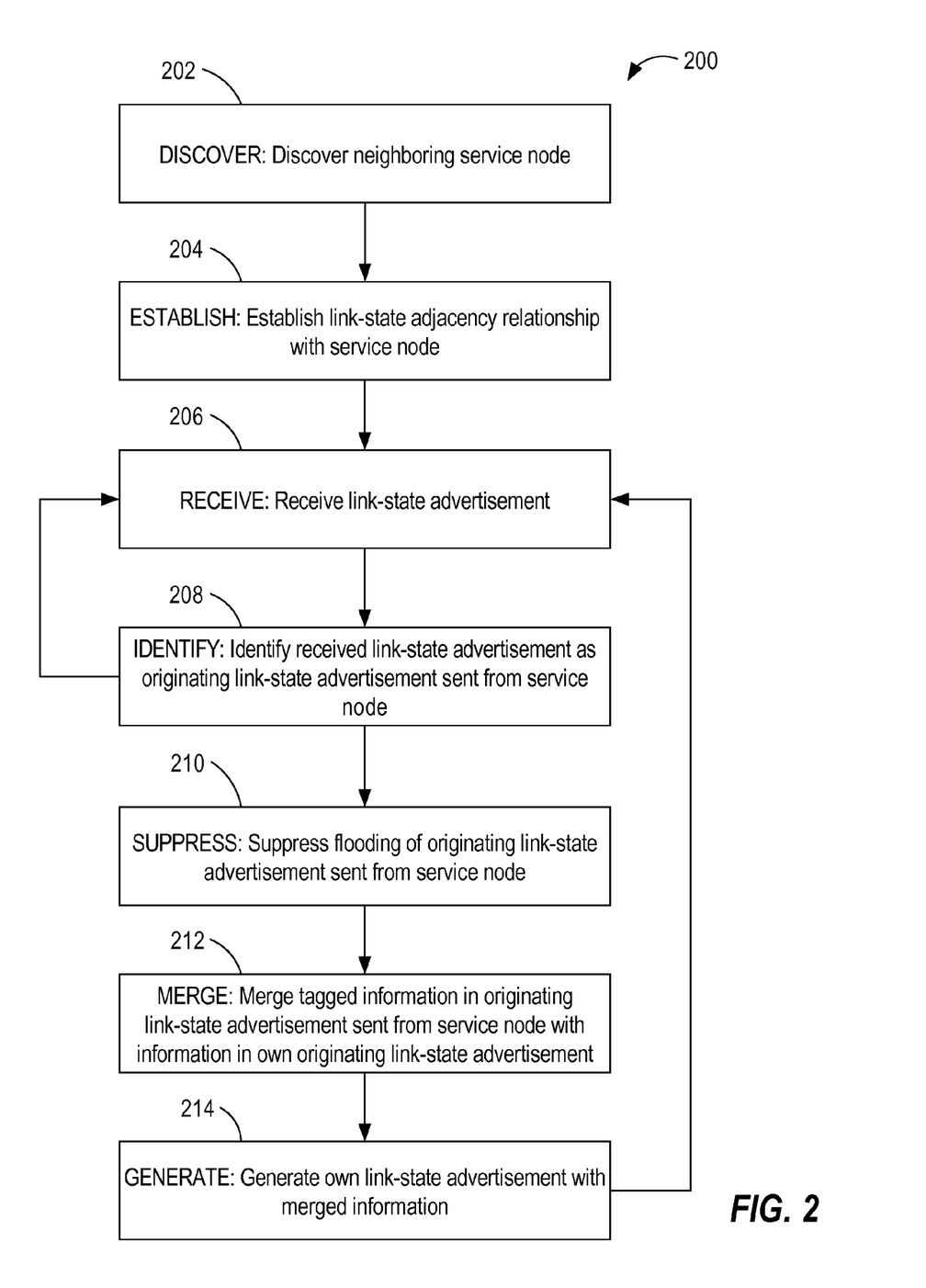
FIG. 2 is a flow diagram of a masking node hiding a service node in a network.

FIG. 2 is a flow diagram of an exemplary process 200 performed by a masking node to hide a service node in a network. In an embodiment, process 200 is performed by each neighboring node of the service node in the network. In one embodiment, the service node is connected to a single neighboring node by a point-to-point link and the neighboring node is connected to the rest of the network through one or more other links and process 200 is performed by the neighboring node to hide the service node from the rest of the network. In general, process 200 comprises the steps of discover, establish, receive, identify, suppress, merge, and generate.

At step 202, the masking node discovers the neighboring service node in accordance with conventional link-state protocol operation. The particular manner of discovery is expected to vary depending on the particular link-state protocol involved. In an exemplary embodiment, a "hello" protocol is used by the making node to discover the neighboring service node. In addition to discovering the neighboring service node, the masking node may also discover one or more other neighboring nodes. For example, the masking node may discover one or more neighboring packet forwarding nodes.

At step 204, a link-state adjacency relationship is established between the masking node and the hidden node in accordance with conventional link-state protocol operation. In an exemplary embodiment, an extension of the "hello" protocol used in the discover step is used to establish and maintain the link-state adjacency relationship. In an embodiment, the masking node establishes and maintains the adjacency relationship over a point-to-point interface with the service node. In addition, the masking node may establish link-state adjacency relationships with other nodes discovered at step 202 such as neighboring packet forwarding nodes as part of normal link state protocol operations.

At step 206, the masking node receives a link-state advertisement. In an embodiment, the link-state advertisement identifies the node that originated the link-state advertisement within the network among other information such as the originating node's links, and for each of the originating node's links, the state of the link, the metric cost of the originating node's interface to the link, and any neighbors that might be connected to the link. The particular data format of the link-state advertisement will vary depending on the particular link-state protocol. For example, for the IS-IS link-state protocol the link-state advertisement will be formatted as a IS-IS Protocol Data Unit (PDU) Link-state Packet (LSP).

At step 208, the masking node identifies the received link-state advertisement as one that originated from the service node. A variety of techniques may be used by the masking node to identify a received link-state advertisement as one that originated from the service node. In an embodiment, the masking node is configured with an identity of the service node to identify link-state advertisements that originate from the service node. Upon receiving a link-state advertisement, the masking node compares the identity of the service node with which it has been configured to an identification of the node that originated the link-state advertisement in the received link-state advertisement. If the identities match, then the masking node identifies the received link-state advertisement as one that originated from the service node. The data format of the identity of the service node with which the masking node is configured and that is contained in the received link-state advertisement will vary depending on the particular link-state protocol. For example, in IS-IS link-state protocol networks, the service node's "system ID" may be used. In OSPF link-state protocol networks, the "Router ID" may be used.

In an embodiment, the masking node identifies the received link-state advertisement as one that originated from the service node by detecting a capability indicator in the received link-state advertisement. The capability indicator indicates to the node receiving the link-state advertisement that the link-state advertisement originated from a node that is to be hidden. The data format of the capability indicator may vary depending on the particular link-state protocol. In one exemplary embodiment in an IS-IS link-state protocol network, the capability indicator is contained with the IS-IS capability TLV of the received link-state advertisement.

In an embodiment in which the masking node is coupled to the service node via a point-to-point link, the masking node is configured to identify all link-state advertisements received over the point-to-point link as originating from the service node.

At step 210, the received link-state advertisement identified as originating from the service node is not flooded (i.e., suppressed) by the masking node to any neighboring nodes or adjacencies of the masking node. In an embodiment in an IS-IS link-state protocol network, flood suppression of an originating link-state packet (LSP) sent from the service node includes the masking node never setting Send Routing Message (SRM) flags for that LSP on any adjacency except that to the service node itself. In an exemplary embodiment in an IS-IS link-state protocol network in which the masking node is communicatively coupled to the service node via a point-to-point link, the masking node does not reference the originating link-state packet in any Complete Sequence Number Protocol Data Units (CSNPs) that it sends, even in CSNPs sent to the service node over the point-to-point link. In an alternative embodiment in an IS-IS link-state protocol network in which the masking node is communicatively coupled to the service node via a point-to-point link, the masking node generates different CSNP sets for sending on the point-to-point link to the service node and other links attached to the masking node.

At step 212, tagged information in the originating link-state advertisement received from the service node is identified and extracted by the masking node. The extracted information is merged by the masking node with information to be sent in one of the masking node's own originating link-state advertisements.

At step 214, the masking node generates its own originating link-state packet containing the merged information and sends the originating link-state packet to the masking node's adjacencies (except to the service node). In this way, a subset of information in one of the service node's own link-state advertisements can be propagated throughout the network in a link-state advertisement originated by the masking node without flooding the originating link-state advertisement sent by the service node.

In an embodiment, the service node uses a particular tag to designate information in its originating link-state advertisements that is to be propagated by the masking node. The information to be propagated is stored in association with the particular tag in originating link-state advertisements sent by the service node. The data format of the particular tag, the information to be propagated, and the association between the tag and the information to be propagated may vary depending on the particular link-state protocol and embodiments are not limited to any particular data format. For example, where the network uses the IS-IS link-state protocol, the data format may be a Type-Length-Value (TLV) encoding in which the type indicates the particular tag and the value contains the information to be propagated. Upon receiving an originating link-state advertisement from the service node, the masking node examines the link-state advertisement for the particular tag. If the particular tag is found in the originating link-state advertisement sent by the service node, the masking node extracts the information to be propagated from the link-state advertisement and includes the information in one or more of its own originating link-state advertisements.

After step 214, process 200 returns to step 206 to await the next link-state advertisement received at the masking node.

Similarly, at step 208, if the link-state advertisement received in at step 206 is not an originating link-state advertisement sent from the service node, then process 200 returns to step 206 without performing steps 208-214 for that link-state advertisement.

Steps 212 and 214 are optional and may not be performed by the masking node, for example, if the originating link-state advertisement sent from the service node does not designate any information to be propagated as in steps 212 and 214.

Embodiments have been described with reference to flowchart of FIG. 2. As to the flowchart, each block within the flowchart represents both a method step and an apparatus element for performing the method step. Depending on the implementation, the corresponding apparatus element may be configured in hardware, software, firmware, or combinations thereof. For example, the computer system 300 of FIG. 3 described below is an example of an apparatus suitable for performing the steps of the process 200 of FIG. 2.

In addition, in this description the steps of process 200 are set forth in a particular order. However, unless specifically stated in the description, embodiments are not necessarily limited to any particular order of carrying out such steps. In particular, the labels used to identify steps of process 200 are used merely for convenient identification of steps, and are not intended to specify or require a particular order of carrying out such steps.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
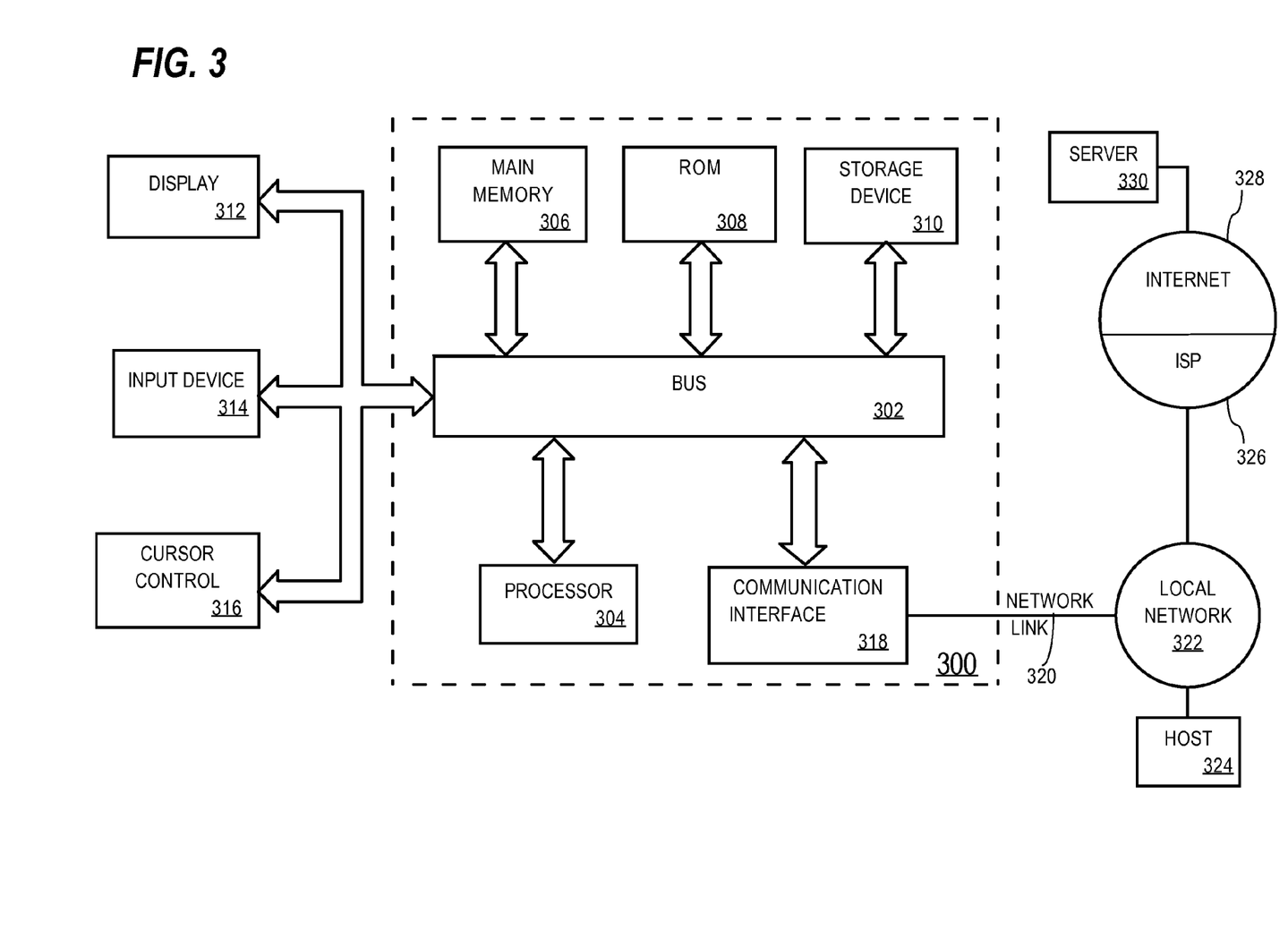
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus, comprising:
   a network interface;
   a processor;
   one or more stored sequences of instructions which, when executed by the processor, cause the processor to perform:
   discovering a service node in a data network in accordance with a link-state protocol, wherein the service node provides a network topology dependent service other than packet forwarding;
   establishing a link-state adjacency with the service node in accordance with the link-state protocol;
   storing an identifier that identifies the service node;

establishing a link-state adjacency with at least one packet forwarding node other than the service node in accordance with the link-state protocol;
receiving a link-state advertisement;
identifying and extracting tagged information contained in the received link-state advertisement;
merging the tagged information with information to be sent from the apparatus;
wherein the tagged information is encoded in the received link-state advertisement as a Type-Length-Value (TLV);
identifying an originating node that sent the link-state advertisement;
in response to matching the originating node to the identifier, identifying the link-state advertisement as an originating link-state advertisement sent from the service node;
in response to identifying the link-state advertisement as the originating link-state advertisement sent from the service node, suppressing flooding of the received link-state advertisement to the at least one packet forwarding node, otherwise sending from the apparatus the originating link-state advertisement containing the merged information.

2. The apparatus of claim 1, further comprising one or more stored sequences of instructions which, when executed by the processor, cause the processor to perform:
receiving a second link-state advertisement from a node other than the service node; and
flooding the second link-state advertisement onto the service node.

3. The apparatus of claim 1, wherein the one or more sequences of instructions that cause the processor to perform establishing a link-state adjacency with the service node in accordance with the link-state protocol comprise one or more stored sequences of instructions which, when executed by the processor, cause the processor to perform establishing the link-state adjacency with the service node over a point-to-point link.

4. The apparatus of claim 1, wherein the one or more sequences of instructions that cause the processor to perform identifying the link-state advertisement as an originating link-state advertisement sent from the service node comprise one or more stored sequences of instructions which, when executed by the processor, cause the processor to perform detecting a capability indicator in the received link-state advertisement indicating that the service node is to be treated as a hidden node.

5. The apparatus of claim 4, where in the capability indicator is contained in a capability Type-Length-Value (TLV) in the received link-state advertisement.

6. The apparatus of claim 1, wherein the service node provides a peer-to-peer (P2P) routing service that is dependent on the network topology.

7. A method implemented in a computer having a processor, a network interface, and memory, the method comprising:
discovering a service node in a data network in accordance with a link-state protocol wherein the service node provides a network topology dependent service other than packet forwarding;
establishing a link-state adjacency with the service node in accordance with the link-state protocol;
storing an identifier that identifies the service node;
establishing a link-state adjacency with at least one packet forwarding node other than the service node in accordance with the link-state protocol;
receiving a link-state advertisement;
identifying and extracting tagged information contained in the received link-state advertisement;
merging the tagged information with information to be sent from an apparatus;
wherein the tagged information is encoded in the received link-state advertisement as a Type-Length-Value (TLV);
identifying an originating node that sent the link-state advertisement;
in response to matching the originating node to the identifier, identifying the link-state advertisement as an originating link-state advertisement sent from the service node;
in response to identifying the link-state advertisement as the originating link-state advertisement sent from the service node, suppressing flooding of the received link-state advertisement to the at least one packet forwarding node, otherwise sending from the apparatus the originating link-state advertisement containing the merged information.

8. The method of claim 7, further comprising:
receiving a second link-state advertisement from a node other than the service node; and
flooding the second link-state advertisement onto the service node.

9. The method of claim 7, wherein establishing a link-state adjacency with the service node in accordance with the link-state protocol comprises establishing the link-state adjacency with the service node over a point-to-point link.

10. The method of claim 7, wherein identifying the link-state advertisement as an originating link-state advertisement sent from the service node comprises detecting a capability indicator in the received link-state advertisement indicating that the service node is to be treated as a hidden node.

11. The method of claim 10, wherein the capability indicator is contained in a capability Type-Length-Value (TLV) in the received link-state advertisement.

12. The method of claim 7, wherein the service node provides a peer-to-peer (P2P) routing service that is dependent on the network topology.

13. The method of claim 7, the method further comprising:
storing data in the memory that reflects the link-state adjacency established with the service node;
storing the received link-state advertisement in the memory;
in response to identifying the link-state advertisement as an originating link-state advertisement sent from the service node, suppressing flooding of the received link-state advertisement to at least one packet forwarding node by changing a state of the memory to indicate that the received link-state advertisement is not to be flooded to the at least one packet forwarding node.

14. A non-transitory computer-readable medium carrying one or more sequences of instructions, which instructions, when executed by one or more processors, cause the one or more processors to perform:
discovering a service node in a data network in accordance with a link-state protocol;
establishing a link-state adjacency with the service node in accordance with the link-state protocol;
storing an identifier that identifies the service node;
establishing a link-state adjacency with at least one packet forwarding node other than the service node in accordance with the link-state protocol;
receiving a link-state advertisement;
identifying and extracting tagged information contained in the received link-state advertisement;

merging the tagged information with information to be sent from an apparatus;
wherein the tagged information is encoded in the received link-state advertisement as a Type-Length-Value (TLV);
identifying an originating node that sent the link-state advertisement;
in response to matching the originating node to the identifier, identifying the link-state advertisement as an originating link-state advertisement sent from the service node;
in response to identifying the link-state advertisement as the originating link-state advertisement sent from the service node, suppressing flooding of the received link-state advertisement to the at least one packet forwarding node, otherwise sending from the apparatus the originating link-state advertisement containing the merged information.

15. A non-transitory computer-readable medium as recited in claim 14, further comprising one or more stored sequences of instructions which, when executed by the one or more processors, cause the one or more processors to perform:
  receiving a second link-state advertisement from a node other than the service node; and
  flooding the second link-state advertisement onto the service node.

16. A non-transitory computer-readable medium as recited in claim 14, wherein the one or more sequences of instructions for establishing a link-state adjacency with the service node in accordance with the link-state protocol further comprise one or more stored sequences of instructions for performing establishing the link-state adjacency with the service node over a point-to-point link.

17. A non-transitory computer-readable medium as recited in claim 14, wherein the one or more sequences of instructions for identifying the link-state advertisement as an originating link-state advertisement sent from the service node further comprise one or more stored sequences of instructions for performing detecting a capability indicator in the received link-state advertisement indicating that the service node is to be treated as a hidden node.

18. A non-transitory computer-readable medium as recited in claim 17, where in the capability indicator is contained in a capability Type-Length-Value (TLV) in the received link-state advertisement.

19. A non-transitory computer-readable medium as recited in claim 14, wherein the service node provides a peer-to-peer (P2P) routing service that is dependent on the network topology.

20. An apparatus, comprising:
  a network interface;
  a processor;
  one or more stored sequences of instructions which, when executed by the processor, cause the processor to perform:
  discovering a service node in a data network in accordance with an Intermediate System to Intermediate System (IS-IS) link-state protocol wherein the service node provides a network topology dependent service other than packet forwarding;
  establishing a link-state adjacency with the service node in accordance with the IS-IS link-state protocol;
  storing an identifier that identifies the service node;
  establishing a link-state adjacency with at least one packet forwarding node other than the service node in accordance with the IS-IS link-state protocol;
  receiving a link-state advertisement;
  identifying an originating node that sent the link-state advertisement;
  in response to matching the originating node to the identifier, determining that the received link-state advertisement is an originating link-state advertisement sent from the service node;
  in response to determining that the received link-state advertisement is the originating link-state advertisement sent from the service node, suppressing flooding of the received link-state advertisement to the at least one packet forwarding node; otherwise:
    identifying and extracting tagged information contained in the received link-state advertisement;
    wherein the tagged information is encoded in the received link-state advertisement as a Type-Length-Value (TLV);
    merging the tagged information with information to be sent in the originating link-state advertisement from the apparatus; and
    sending from the apparatus the originating link-state advertisement containing the merged information.

* * * * *